United States Patent
Sridharan (10) Patent No.: US 10,802,747 B2
(45) Date of Patent: Oct. 13, 2020

(54) PERFORMING BACKUP OPERATIONS USING REPLICAS

(71) Applicant: Veritas Technologies LLC, Mountain View, CA (US)

(72) Inventor: Srineet Sridharan, Pune (IN)

(73) Assignee: VERITAS TECHNOLOGIES LLC, Santa Clara, CA (US)

(*) Notice: Subject to any disclaimer, the term of this patent is extended or adjusted under 35 U.S.C. 154(b) by 67 days.

(21) Appl. No.: 15/826,835

(22) Filed: Nov. 30, 2017

(65) Prior Publication Data

US 2019/0163372 A1   May 30, 2019

(51) Int. Cl.
   *G06F 3/06*   (2006.01)
   *G06F 11/20*   (2006.01)
   *G06F 11/14*   (2006.01)

(52) U.S. Cl.
   CPC ............. *G06F 3/065* (2013.01); *G06F 3/067* (2013.01); *G06F 3/0619* (2013.01); *G06F 3/0664* (2013.01); *G06F 11/1464* (2013.01); *G06F 11/1471* (2013.01); *G06F 11/2094* (2013.01); *G06F 11/2097* (2013.01); *G06F 2201/815* (2013.01); *G06F 2201/84* (2013.01)

(58) Field of Classification Search
   CPC ...... G06F 3/065; G06F 3/0619; G06F 3/0664; G06F 3/067
   See application file for complete search history.

(56) References Cited

U.S. PATENT DOCUMENTS

| | | | |
|---|---|---|---|
| 9,367,260 B1 | 6/2016 | Natanzon | |
| 9,823,973 B1 | 11/2017 | Natanzon | |
| 2014/0149695 A1* | 5/2014 | Zaslavsky | G06F 12/16 711/162 |
| 2015/0143064 A1* | 5/2015 | Bhargava | G06F 11/1451 711/162 |
| 2015/0378839 A1 | 12/2015 | Langouev et al. | |
| 2016/0019317 A1* | 1/2016 | Pawar | G06F 16/907 707/649 |
| 2016/0092308 A1* | 3/2016 | Bates | G06F 11/2025 714/4.11 |
| 2017/0286512 A1 | 10/2017 | Zhang et al. | |
| 2018/0060184 A1* | 3/2018 | Thakkar | G06F 11/1464 |
| 2018/0129569 A1* | 5/2018 | Jathar | G06F 11/1451 |
| 2018/0276085 A1* | 9/2018 | Mitkar | G06F 11/324 |

OTHER PUBLICATIONS

Du, Yuyang, et al., "Paratus: Instantaneous Failover via Virtual Machine Replication," 2009 8th International Conference on Grid and Cooperative Computing, IEEE, Aug. 27, 2009, pp. 307-312.
PCT International Written Opinion and Search Report of the International Searching Authority for Application No. PCT/US2018/062744 dated Mar. 22, 2019, 13 pages.

* cited by examiner

*Primary Examiner* — Nanci N Wong
(74) *Attorney, Agent, or Firm* — Campbell Stephenson LLP (57) ABSTRACT

Disclosed herein are methods, systems, and processes to perform backup operations using replicas. A replica of a virtual machine is created as part of a replication operation. The replica includes data associated with the virtual machine and metadata associated with applications executing on the virtual machine. A backup operation generates a backup image from the replica using the metadata.

20 Claims, 9 Drawing Sheets

PERFORMING BACKUP OPERATIONS USING REPLICAS

FIELD OF THE DISCLOSURE

The present disclosure relates to performing backup operations. In particular, this disclosure relates to performing backup operations using replicas.

DESCRIPTION OF THE RELATED ART

In order to prevent data loss, data can be backed up. Data backup operations produce backup images. A backup image includes a backup copy of application data or the contents of a given storage entity, such as a file system or disk drive. Such backup images can be stored and/or maintained in remote cloud-based storage devices in the form of cloud backups for retrieval and restoration at a later time, for example, in case of hardware failure, and the like.

Data replication involves making duplicate copies of data and improves reliability, fault-tolerance, and/or accessibility. The purpose of data replication is to prevent data loss if failures or disasters occur in one location. If such failures or disasters do occur that destroy or damage a copy of the data in one location, the copy of the data at a secondary site can be accessed. For these purposes, among others, replicated data can also be stored and/or maintained in remote cloud-based storage devices, for example, in the form of replicas.

Backup and replication solutions each have their own advantages and drawbacks, and are therefore frequently implemented (and packaged) together, for example, in cloud backup and cloud-based disaster recovery (DR) services (e.g., as backup destinations and DRaaS (Disaster Recovery as a Service)). For example, backup involves making a secondary copy of data that can be restored to use if the primary copy becomes lost or unusable. Backup images include a point-in-time copy of primary data typically taken on a repeated cycle (e.g., daily, monthly, yearly, and the like). On the other hand, replication is either synchronous or asynchronous, and transfer of data to a remote copy of achieved either immediately or within a short time delay, respectively. In modern computing environments, both backup and replication require large amounts of data to be transmitted over networks (e.g., to a cloud backup and DR service provider).

In addition, because data corruption or user file deletion is immediately or very quickly replicated to a secondary copy, replication is ineffective as a backup method. Further, because replication only maintains only copy of data at a cloud location, a replicated copy does not include historical versions of data (e.g., from preceding weeks, months, and the like). On the contrary, because a backup copy is a point in time copy of data, full and incremental backup images can be created, thus providing appreciable storage benefits.

Therefore, it is not surprising that modern businesses and organizations implement both backup and replication solutions, for example, to protect and guarantee the same data. Unfortunately, such modern businesses and organizations bear significant separate costs related to network bandwidth—for cloud backups, and separately, for cloud-based DR services. For example, the same data transmitted from on premise storage to cloud-based storage as part of a backup operation, has to be re-transmitted from on premise storage to cloud-based storage as part of a replication operation. This re-transmission of data is not only redundant and discourages cloud adoption, but also results in costly and wasteful network bandwidth utilization.

SUMMARY OF THE DISCLOSURE

Disclosed herein are methods, systems, and processes to perform backup operations using replicas. One such method involves creating a replica of a virtual machine as part of a replication operation. In this example, the replica includes data associated with the virtual machine and metadata associated with applications executing on the virtual machine. The method then performs a backup operation by generating a backup image from the replica using the metadata.

In one embodiment, the metadata includes information for granular restore of the virtual machine, is generated by quiescing the applications, and is stored on the virtual disks. In another embodiment, generating the backup images includes generating a snapshot that identifies a reference point in time to create the backup image of the data prior to performing the backup operation, retrieving the metadata from the replica, and generating a full backup image or an incremental backup image based on the reference point in time.

In some embodiments, the metadata includes data locations of blocks of the data, and the data locations are used by the backup server to restore the virtual machine from the backup image. In other embodiments, the backup operation is performed by a backup proxy instantiated on a cloud computing device as part of performing the backup operation, the backup proxy is another virtual machine, a container, or a server-less module, the quiescing of the applications is performed by a replication agent executing on the virtual machine, the metadata is generated by a backup agent executing on the virtual machine, and the replication operation is performed by the replication agent.

In certain embodiments, generating the backup images includes generating the snapshot of the data at the reference point in time, generating the backup image in a backup format, mounting the snapshot, retrieving granular metadata for the one or more applications from the metadata in the replica, and sending the granular metadata to the backup server.

The foregoing is a summary and thus contains, by necessity, simplifications, generalizations and omissions of detail; consequently those skilled in the art will appreciate that the summary is illustrative only and is not intended to be in any limiting. Other aspects, features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features and advantages made apparent to those skilled in the art by referencing the accompanying drawings.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

Data backup and data replication are not mutually exclusive, and are thus typically implemented together by modern businesses and organizations to safeguard and provision the same data. For example, cloud-based service providers frequently provide both cloud-based backup (e.g., for data restoration, data security, and the like) and cloud-based replication services (e.g., Disaster Recovery as a Service (DRaaS), and the like).

Backup operations produce a point in time copy of data that includes a copy of the operating system (OS) and the data associated with a computing device and/or virtual machine, including the system state and application configurations. The backup is typically saved as a single file called a backup image (e.g., on a cloud storage device), and the backup process uses snapshots to ensure that even deleted files and empty disk blocks are backed up. Therefore, backup operations produce backup metadata that is collected during the backup process and stored as part of a backup image to identify the state of a system and corresponding applications at a point in time (e.g., for granular restore purposes). Such backup metadata can be used to create future incremental backup images, and thus provides significant network and storage savings, as well as the capability to restore a computing device from a backup image by reassembling the computing device's data from one or more previous backup images.

On the other hand, replication operations produce an identical copy of data associated with a computing device and/or virtual machine. Such identical copies are stored as replicas (e.g., on cloud storage devices). Because a replication process only produces a single identical copy of data (e.g., either synchronously or asynchronously, which can then be copied back in full in the case of a disaster), the replication process does not (and indeed has no need to) replicate metadata associated with replicated data (e.g., information regarding historical versions of data, block and/or file location information, block-level information for granular restore, data location(s), and the like). Therefore, replicas do not contain information that enables the creation of backup images and/or permits the granular restore of data from such backup images.

Unfortunately, and as previously noted, in modern computing environments, both backup and replication operations involve the transmission of large amounts of data over networks. Because enterprises implement both backup and replication solutions to protect and guarantee the same data, these enterprises bear significant and distinct costs related to network bandwidth—for cloud backups, and separately, for cloud-based DR services. For example, the same data transmitted from on premise storage to cloud-based storage as part of a backup operation, has to be re-transmitted from on premise storage to cloud-based storage as part of a replication operation. This re-transmission of data is not only redundant and discourages cloud adoption, but also results in costly and wasteful network bandwidth utilization.

Disclosed herein are methods, systems, and processes to generate full or incremental backup images using replicas (e.g., replicated data), while at the same time requiring only a single transmission of the data as part of a replication operation.

Example Backup and Replication Computing Environment

Figure 1:
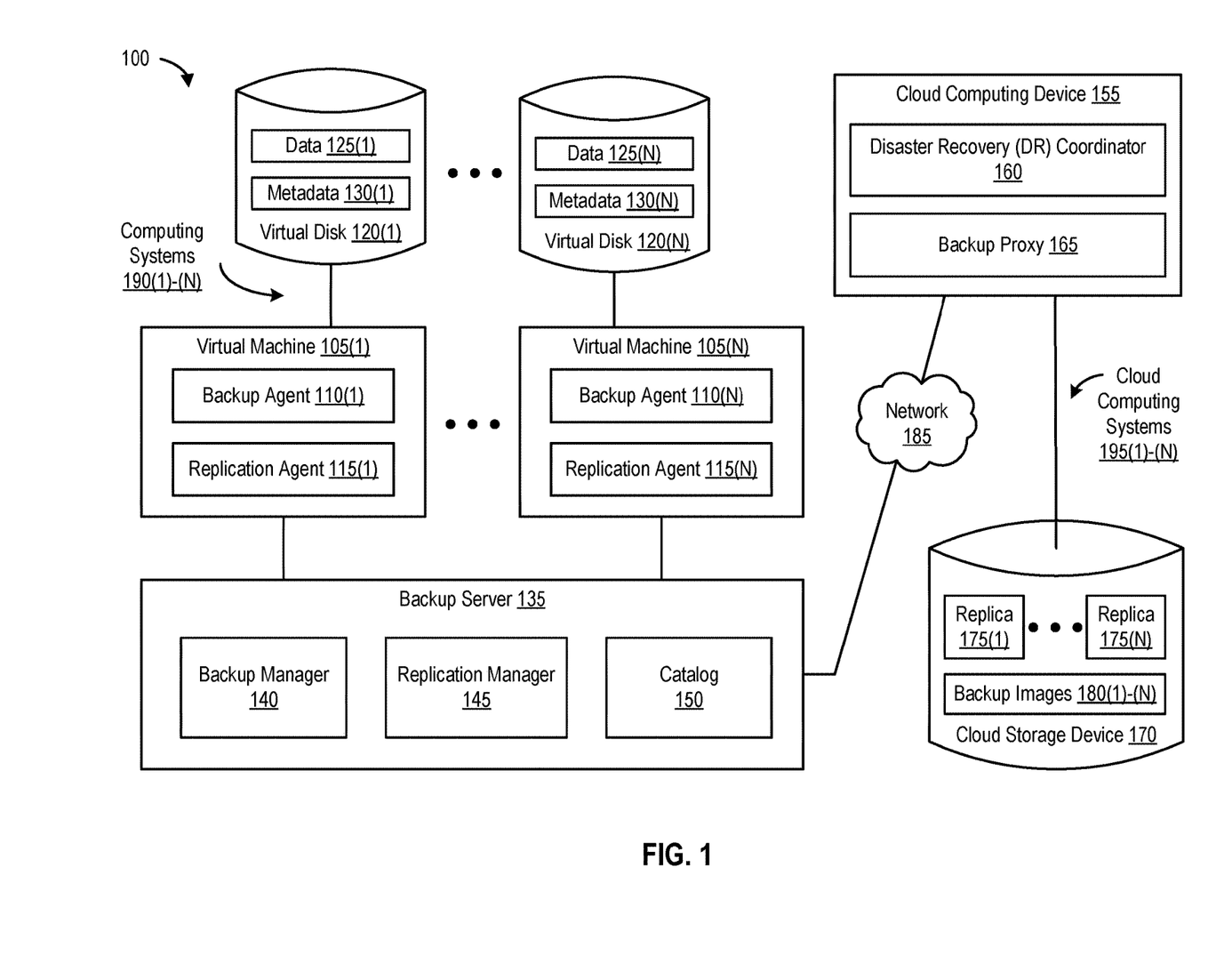
FIG. 1 is a block diagram 100 of a backup and replication computing system, according to one embodiment of the present disclosure.

FIG. 1 is a block diagram 100 of a backup and replication computing system, according to one embodiment. As shown in FIG. 1, an example integrated backup and replication computing environment includes at least virtual machines 105(1)-(N) that are communicatively coupled with (corresponding) virtual disks 120(1)-(N). It should be noted that in addition to virtual machines and virtual disks, the example integrated backup and replication computing environment can also include physical computing devices and physical storage disks.

Virtual machine 105(1) implements at least a backup agent 110(1) and a replication agent 115(1). Backup agent 110(1) generates metadata associated with a backup operation and replication agent 110(1) quiesces one or more applications executing on virtual machine 105(1) (e.g., instructs the applications to flush their in-memory data to virtual disk 120(1)). Virtual disk 120(1) stores data 125(1) and metadata 130(1) (e.g., backup metadata generated by backup agent 110(1)). Virtual machines 105(1)-(N) (including virtual disks 120(1)-(N)) are part of computing systems 190(1)-(N)), and are communicatively coupled to a backup server 135.

Backup server 135 performs backup, replication, and/or restore operations, and implements at least a backup manager 140, a replication manager 145, and a catalog 150. Backup manager 140 manages backup operations to a cloud computing device 155 (e.g., in conjunction with a backup proxy 165), replication manager 145 manages replication operations performed to cloud computing device 155 (e.g., by replication agents 115(1)-(N)), and catalog 150 is stored and used by backup server 135 to perform restore operations (e.g., granular restore).

As shown in FIG. 1, cloud computing device 155 is communicatively coupled to backup server 135 by network 185 and implements at least a disaster recovery (DR) coordinator 160 (which provides DRaaS service(s)) and backup proxy 165 (instantiated to perform backup operations). Cloud computing device 155 is communicatively coupled to a cloud storage device 170, and together with cloud storage device 170 is part of cloud computing systems 195(1)-(N). Cloud storage device 170 stores replicas 175 (1)-(N) and backup images 180(1)-(N).

Backup server 135, physical computing devices that are part of computing systems 190(1)-(N), and/or cloud computing device 155 can be any of a variety of different computing devices, including a server, personal computing device, laptop computer, cellular phone, or the like. Network 185 can be any type of network and/or interconnection (e.g., the Internet, a Wide Area Network (WAN), and the like). Cloud storage device 170 and/or physical storage devices associated with computing systems 190(1)-(N) can include one or more of a variety of different storage devices, including hard disks, compact discs, digital versatile discs, solid state drive (SSD) memory such as Flash memory, and the like, or one or more logical storage devices such as volumes implemented on one or more such physical storage devices.

In one embodiment, replication agent 115(1) implemented by virtual machine 105(1) creates a replica of virtual machine 105(1) as part of a replication operation. In this example, the replica (e.g., replica 175(1)) includes data associated with virtual machine 105(1) (e.g., data 125(1)) and metadata associated with applications executing on virtual machine 105(1) (e.g., metadata 130(1). Backup proxy 165 then generates a backup image (e.g., backup image 180(1)) from the replica using the metadata.

In some embodiments, metadata 130(1) includes information for granular restore of virtual machine 105(1) (e.g., data location(s), and the like). Replication agent 115(1) generates and/or collects metadata 130(1) by quiescing one or more applications executing on virtual machine 105(1) (e.g., by instructing one or more applications to flush their in-memory data to virtual disk 120(1)—thus, storing metadata 130(1) on virtual disk 120(1)). In this example, metadata 130(1) includes locations of blocks of data and the data locations are used by backup server 135 to restore virtual machine 105(1) from backup image 180(1), if needed.

In other embodiments, generating backup images includes generating a snapshot that identifies a reference point in time to create a backup image of data 125(1) prior to performing the backup operations, retrieving metadata 130(1) from replica 175(1), and generating a full backup image or an incremental backup image based on the reference point in time. In this example, the backup operation (e.g., generating backup images) is performed by backup proxy 165 which is instantiated on cloud computing device 155 by backup manger 140 as another virtual machine, a container, or a server-less module.

In certain embodiments, generating backup images 180 (1)-(N) includes generating the snapshot of data (e.g., data 125(1)-(N) of virtual machines 105(1)-(N)) at the reference point in time, generating backup image 180(1) in a backup format, mounting the snapshot, retrieving metadata 130(1) for applications from replica 175(1) (e.g., granular metadata captured by replication agent 115(1) and replicated to cloud storage device 170 by replication manager 145 and DR coordinator 160), and sending the granular metadata to backup server 135 (e.g., to be used as catalog 150 for granular restore).

As previously noted, replica 175(1) contains replicated data of virtual machine 105(1) and is stored in cloud storage device 170 in the same format as data 125(1) is stored on virtual disk 120(1). Therefore, replica 175(1) a mirrored copy of data 125(1) (e.g., there exists a 1:1 correspondence between data blocks of replica 175(1) and data 125(1)), and is thus useful for failover operations performed to cloud computing device 155. For example, a cloud virtual machine can be created and/or instantiated from replica 175(1).

On the other hand, and also as previously noted, a backup can be generated in a format that is different than the original data (e.g., as the result of incremental backups, deduplication, and the like). Therefore, a backup image, at least on its own, does not maintain a 1:1 correspondence between data blocks of backup image 180(1) and data 125(1). In addition, a backup image can be generated in a format that is different than the original format of data 125(1). For example, data 125(1) can be a single virtual machine disk image, where as backup image 180(1) can include several one megabyte blocks.

Example of Generating a Backup on Schedule Through a DRaaS System

Figure 2:
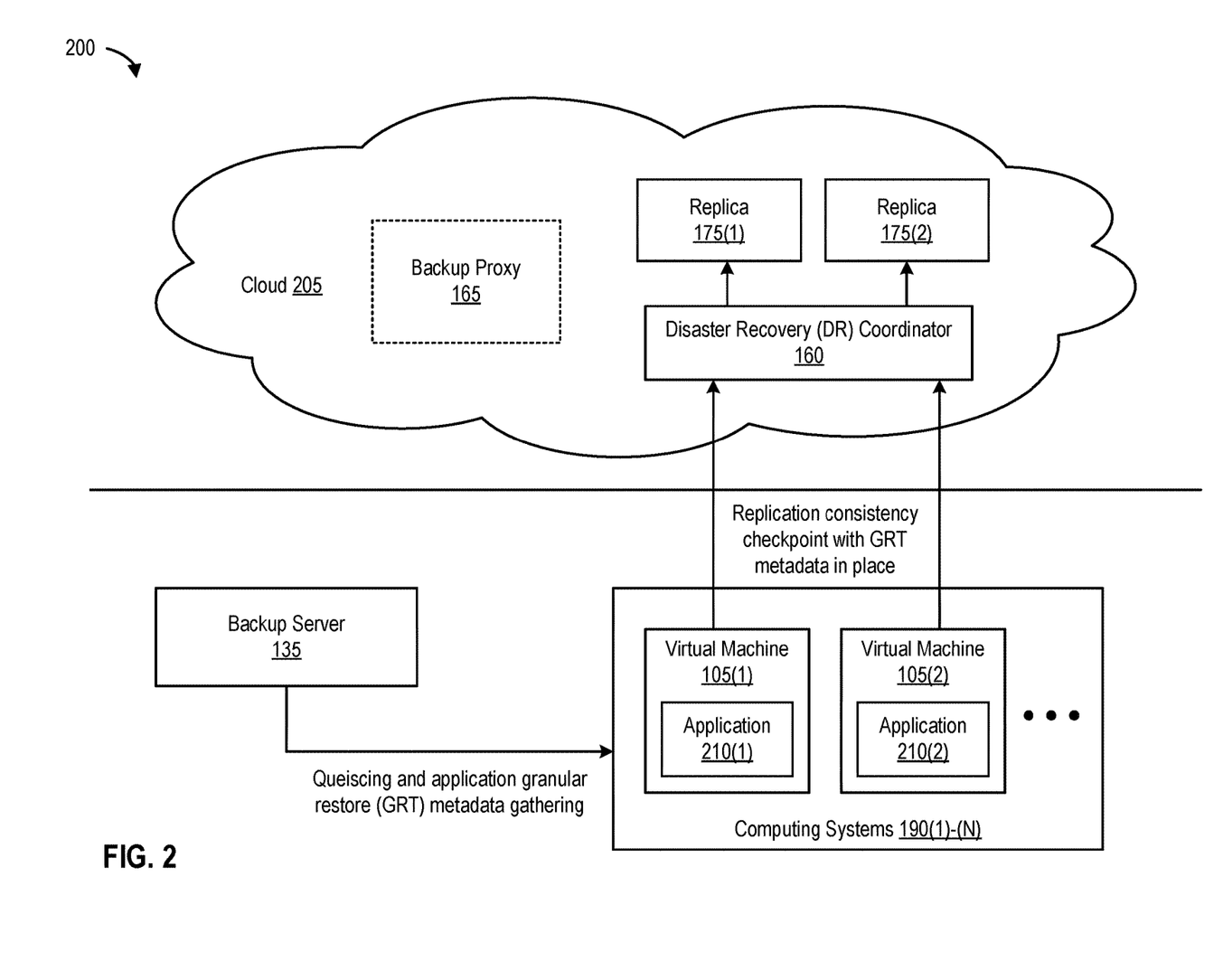
FIG. 2 is a block diagram 200 of a backup and replication computing environment, according to one embodiment of the present disclosure.

FIG. 2 is a block diagram 200 of a backup and replication computing environment, according to one embodiment. As shown in FIG. 2, cloud 205 (e.g., cloud computing systems 195(1)-(N)) includes at least a backup proxy 165, replicas 175(1) and 175(2), and DR coordinator 160. DR coordinator 160 continuously replicates virtual machine disk images of virtual machines 105(1) and 105(2) to cloud 205 (e.g., a corresponding virtual machine disk image is created in cloud 205 and is continuously replicated to keep the virtual machine disk image in sync with virtual disk 120(1)).

Backup server 135 monitors and manages quiescing and application granular restore (GRT) metadata gathering performed by on premise backup agents and replication agents (e.g., metadata of an email database and associated information such as emails, locations, files, and the like). When on premise replication agents (e.g., replication agents 115 (1)-(N)) perform replication, replication consistency checkpoints as part of the GRT metadata capture process. For example, when the need for a backup operation is conveyed to replication agent 115(1) by backup agent 110(1), replication agent 115(1) quiesces application 210(1) and sets a marker, a flag, or similar type of indicator indicating a consistent point in time for a backup operation to pick up from if and when the backup operation is performed in cloud 205 by backup proxy 165. It should be noted that replication agents 115(1)-(N) and backup agents 110(1)-(N) can be implemented on guest virtual machines as well as by host hypervisors.

In one embodiment, to create a backup image on schedule through a DRaaS system (e.g., DR coordinator 160), an on premise backup agent (e.g., backup agent 110(1)) first interacts with a DRaaS replication agent (e.g., replication agent 115(1)) indicating the need for a backup. Replication agent 115(1) next performs application quiescing and invokes custom-action of backup agent 110(1). For example, replication agent 115(1) requests and/or instructs application 210(1) to push in-memory data to virtual disk 120(1), and backup agent 110(1) registers a callback function with replication agent 115(1).

As part of the custom-action, backup agent 110(1) collects and stores high-level metadata (e.g., granular metadata such as metadata for emails in a database, data locations for application data, block-level information, and the like) on virtual disk 120(1) (e.g., as metadata 130(1)). Backup agent 110(1) also conveys backup method information (e.g., whether the backup is a full backup or an incremental backup) to replication manager 145. Next, replication manager 145, in conjunction with replication agent 115(1), synchronizes the captured metadata (e.g., granular metadata, GRT metadata, and the like) to cloud 205. For example, after replication agent 115(1) completes application quiescing, backup agent 110(1) captures metadata information and stores the metadata information (e.g., in a file on virtual disk 120(1) and/or as metadata 130(1)). This captured and stored metadata is replicated to cloud 205 as part of a replication operation (e.g., stored as part of replicas 175(1)).

Figure 3:
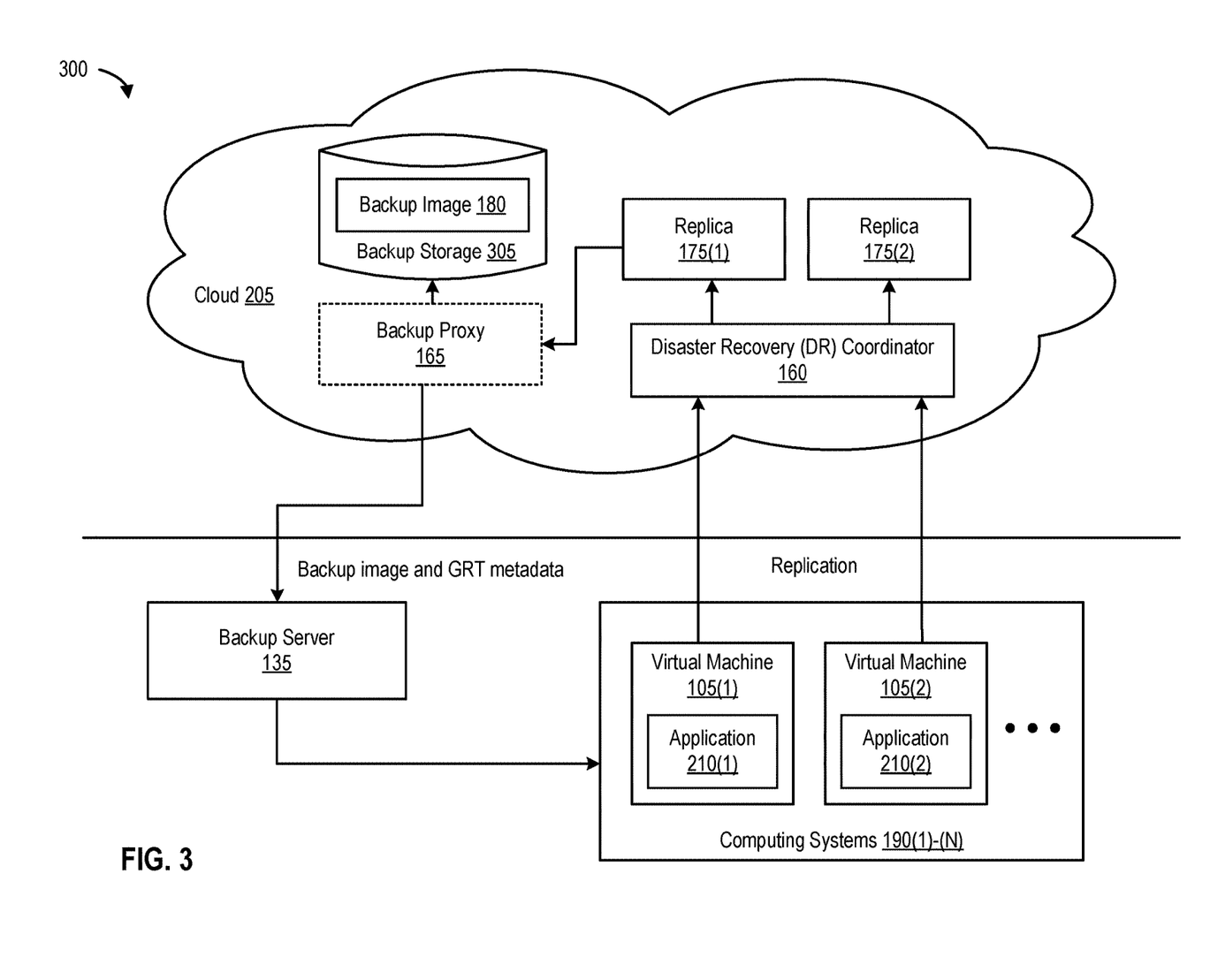
FIG. 3 is a block diagram 300 of a backup and replication computing environment, according to one embodiment of the present disclosure.

FIG. 3 is a block diagram 300 of a backup and replication computing environment, according to one embodiment. After granular metadata is synchronized with cloud 205, DR coordinator 160 invokes backup proxy 165. Backup proxy 165, which as noted previously can be instantiated in cloud 205 as a virtual machine, a container, or a server-less module by backup manager 140, generates a snapshot of data at this point in time (e.g., data 125(1) replicated as replica 175(1) with a replication consistency checkpoint) and generates a backup image (e.g., backup image 180 in a backup-friendly format from the replication consistency checkpoint if backup image 180 is generated as an incremental backup image) in backup-friendly storage provided by cloud computing device 155 (e.g., writing a block or list of blocks to a block blob, appending blocks to an append blob, writing pages to a page blob, and the like).

Backup proxy 165, which can be instantiated on-demand in cloud 205, then mounts the snapshot and using information gathered from application quiescing (e.g., application information), gathers, extracts, and/or collects full item-level granular metadata from files and applications. For example, backup proxy 165 gathers granular metadata for emails in an email database on a machine image (e.g., replica 175(1)). This granular metadata is read by backup server 135 and is stored in catalog 150 (e.g., as a rich granular catalog of backup image 180).

As previously noted, backup agent 110(1) sends information to replication agent 115(1) informing replication agent 115(1) that a full backup has been requested by backup manager 140. Replication agent 115(1) uses this point in time as a base to maintain and/or track changed data (e.g., deltas or logs) as part of the replication process. In addition, depending on whether backup proxy 165 is creating a full backup image or an incremental backup image, backup proxy 165 reads all or only changed data from the reference/base point in time to create the corresponding backup image.

Example Processes to Generate Backup Images from Replicas

Figure 4:
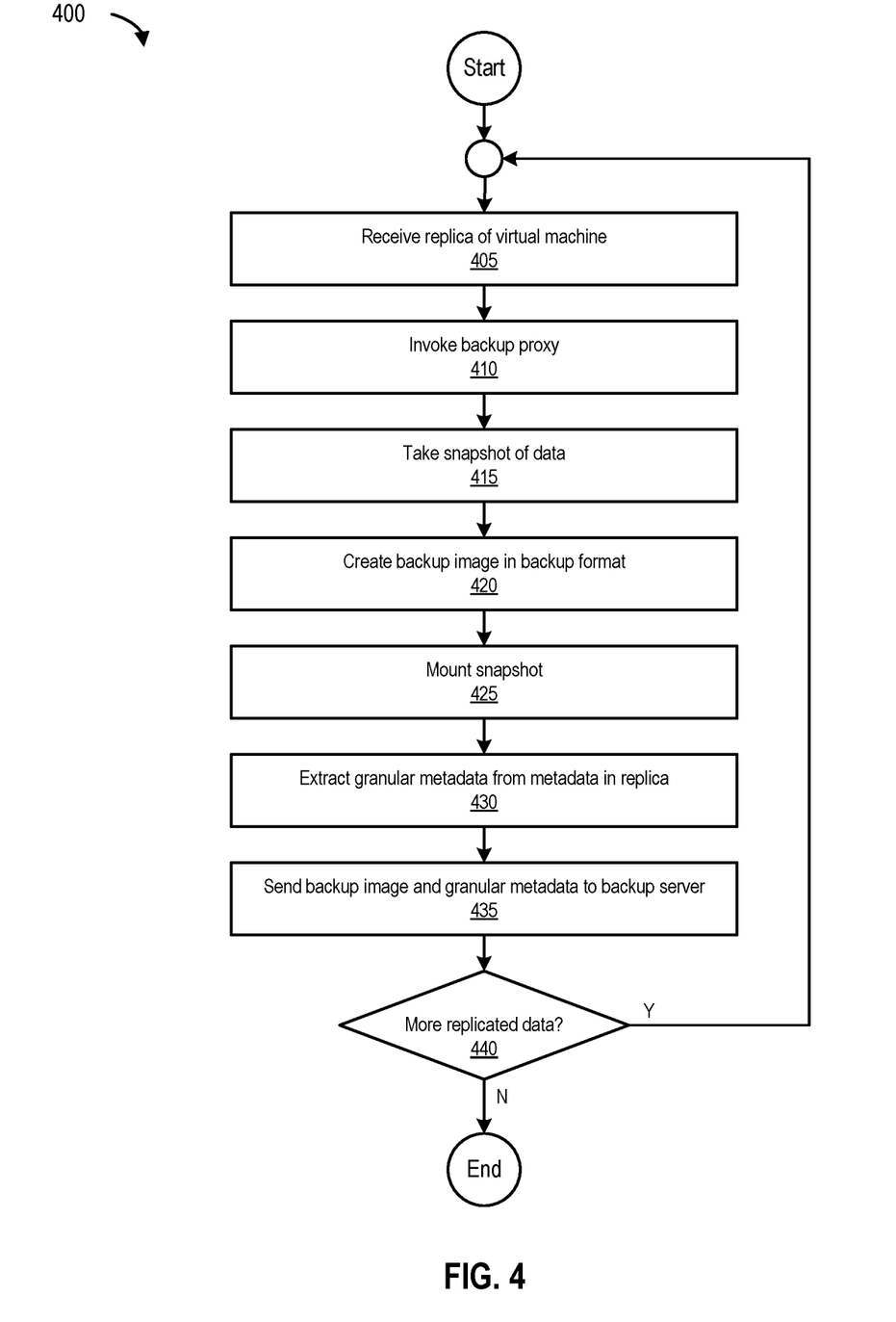
FIG. 4 is a flowchart 400 of a process for generating backup images from replicas, according to one embodiment of the present disclosure.

FIG. 4 is a flowchart 400 of a process for generating backup images from replicas and performing granular restore, according to one embodiment. The process begins at 405 by receiving a replica of a virtual machine (e.g., replication agent 115(1) implemented on virtual machine 105(1) sends data 125(1) and metadata 130(1) to cloud computing device 155). At 410, the process invokes a backup proxy (e.g., backup proxy 165 which can be instantiated on-demand in cloud 205 by backup manager 140 as a virtual machine, a container, a server-less module, and the like). It should be noted that the backup proxy is invoked and the remaining steps of FIG. 4 are performed according to a backup schedule (e.g., when a backup agent communicates with a replication agent regarding the need for a backup operation). At 415, the process takes a snapshot of data (e.g., data 125(1) in replica 175(1)), and at 420 creates a backup image in backup format (e.g., backup proxy 165 creates backup image 180 on backup storage 305 as shown in FIG. 3). At 425, the process mounts the snapshot, and at 430, extracts granular metadata (e.g., from metadata 130(1)) in the replica (e.g., replica 175(1)). At 435, the process sends the backup image and granular metadata to a backup server (e.g., backup image 180 and GRT metadata to backup server 135 as shown in FIG. 3), and at 440, determines if there is more replicated data. If there is more replicated data (and a backup operation followed by a restore operation applicable to the newly replicated data has been requested), the process loops to 405. Otherwise, the process ends.

Figure 5A:
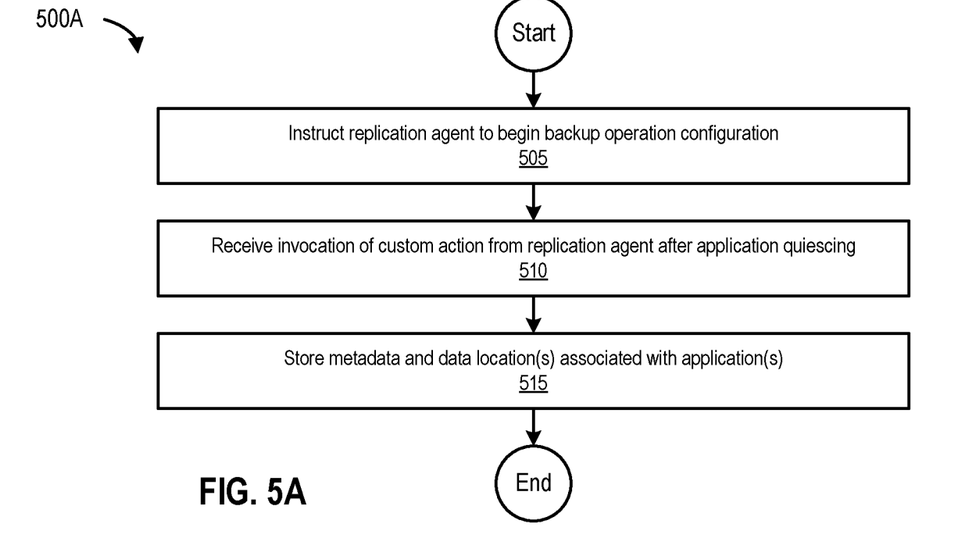
FIG. 5A is a flowchart 500A of a process for storing metadata for replication, according to one embodiment of the present disclosure.

FIG. 5A is a flowchart 500A of a process for storing metadata for replication, according to one embodiment. The process begins at 505 by instructing (or requesting) a replication agent (e.g., replication agent 115(1)) to begin backup operation configuration (e.g., that a full backup has been requested and to set a replication consistency checkpoint). At 510, the process receives invocation of custom action from the replication agent after application quiescing has been performed (e.g., by backup agent 110(1)). The process ends at 515 by storing application information (e.g., GRT metadata with data location(s), and the like) associated with the application(s).

Figure 5B:
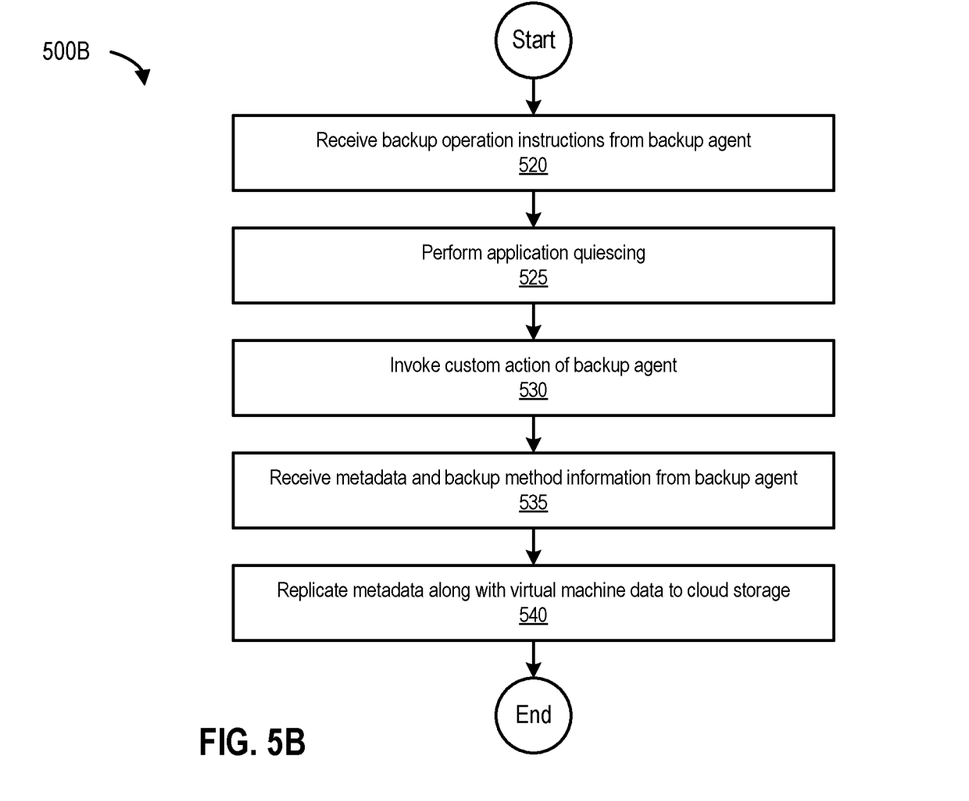
FIG. 5B is a flowchart 500B of a process for replicating metadata, according to one embodiment of the present disclosure.

FIG. 5B is a flowchart 500B of a process for replicating metadata, according to one embodiment. The process begins at 520 by receiving backup operation instructions from a backup agent (e.g., backup method information from backup agent 110(1)). At 525, the process performs application quiescing (e.g., in-memory data flush), and at 530, invokes custom-action of the backup agent (e.g., backup agent 110(1) registers a call back function with replication agent 115(1)). At 535, the process receives metadata (e.g., high-level metadata about applications, their data locations, and the like, gathered by backup agent 110(1) by performing one or more queries). The process ends at 540 by replicating the metadata along with virtual machine data to cloud storage (e.g., to DR coordinator 160, cloud computing device 155 and/or cloud 205 as a part of a replica).

Figure 6:
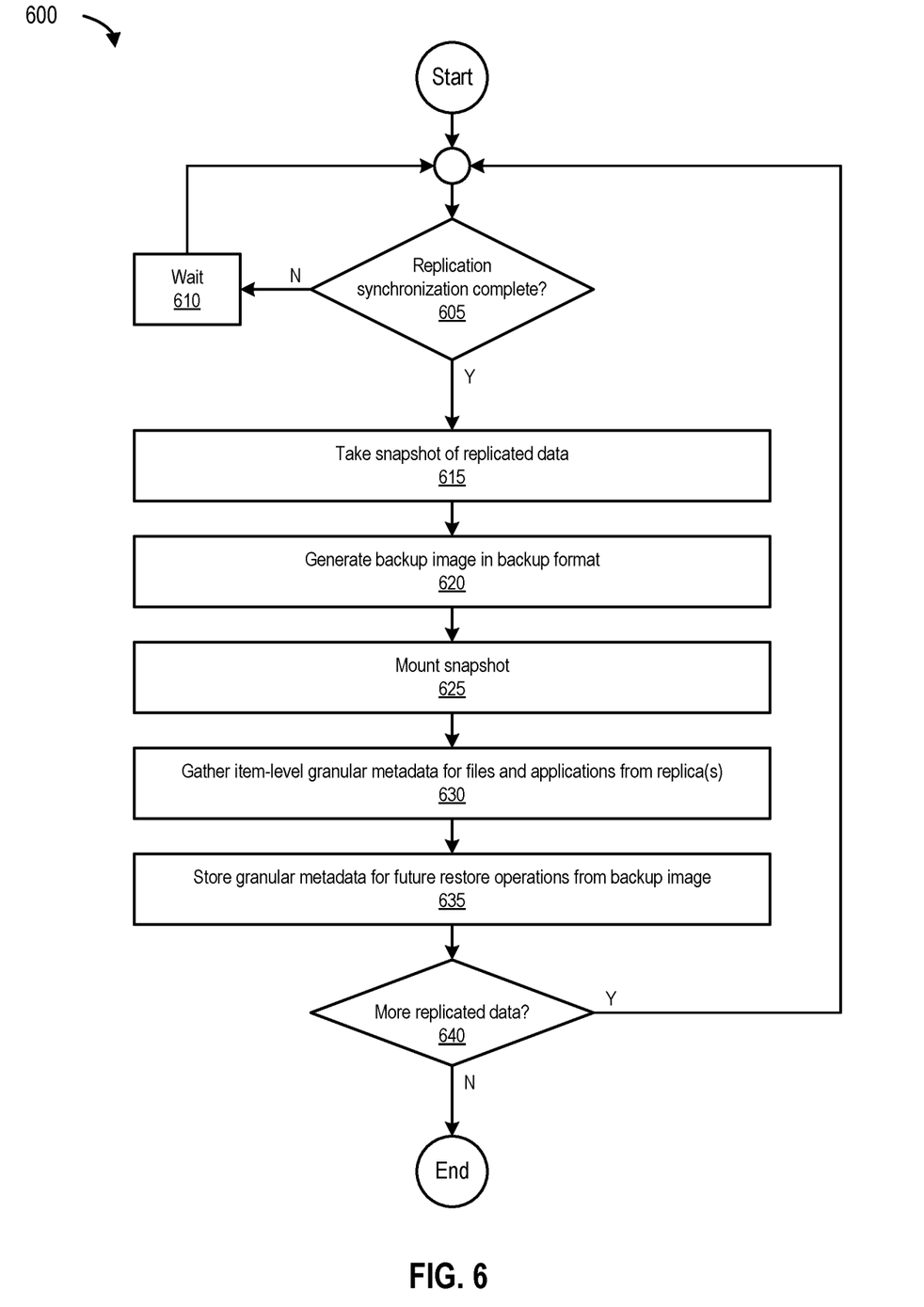
FIG. 6 is a flowchart 600 of a process for storing metadata for restore operations, according to one embodiment of the present disclosure.

FIG. 6 is a flowchart 600 of a process for storing metadata for restore operations, according to one embodiment. The process begins at 605 by determining whether replication synchronization is complete. If replication synchronization (e.g., metadata synchronization to compute-friendly cloud storage) is incomplete, the process, at 610, waits. However, if replication synchronization is complete, the process, at 615, takes a snapshot of the replicated data (e.g., data in a replica), and at 620, generates a backup image in a backup format. At 625, the process mounts the snapshot, and at 630, gathers item-level granular metadata for files and applications from the replica. At 635, the process stores the granular metadata for future restore operations from the backup image. At 640, the process determines if there is more replicated data (e.g., whether a new backup operation has been requested). If there is more replicated data, the process loops to 605. Otherwise, the process ends.

Figure 7A:
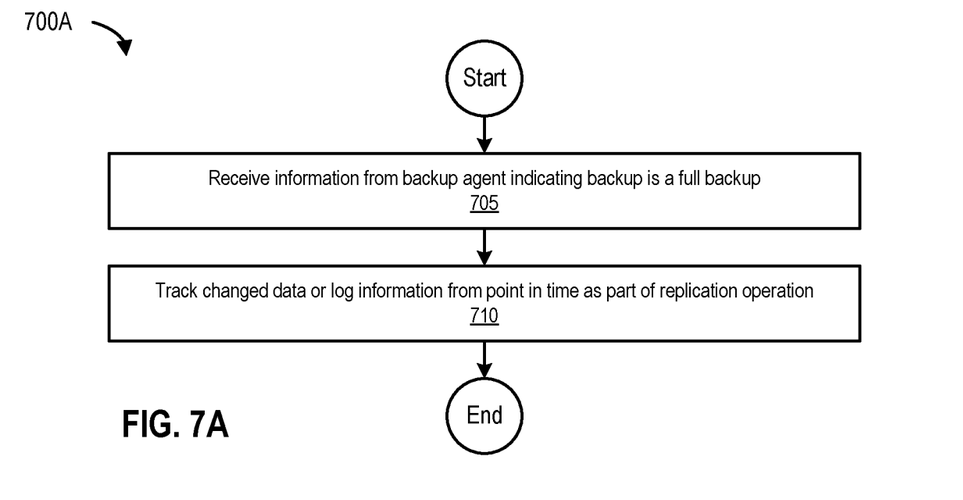
FIG. 7A is a flowchart 700A of a process for tracking changed data as part of replication, according to one embodiment of the present disclosure.

FIG. 7A is a flowchart 700A of a process for tracking changed data as part of replication, according to one embodiment. The process begins at 705 by receiving information from a backup agent indicating that a full backup has been requested. The process ends at 710 by tracking changed data or log information from this (reference) point in time as part of the replication operation (e.g., a replication consistency checkpoint).

Figure 7B:
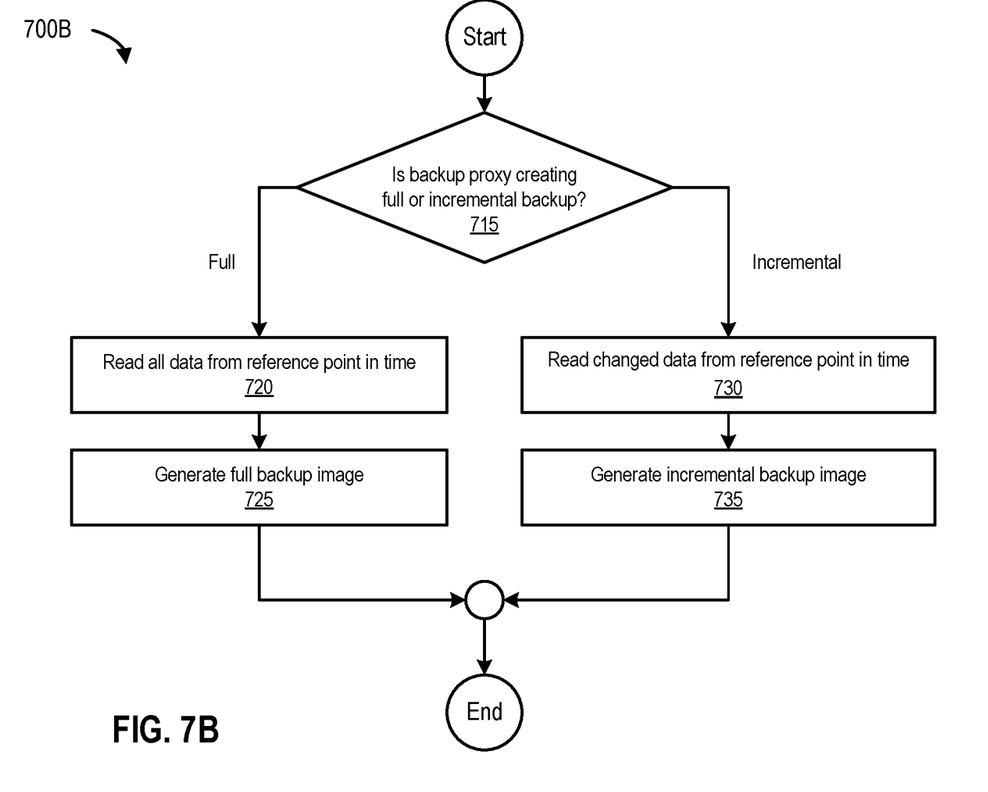
FIG. 7B is a flowchart 700B if a process for generating full or incremental backups from replicas, according to one embodiment of the present disclosure.

FIG. 7B is a flowchart 700B if a process for generating full or incremental backups from replicas, according to one embodiment. The process begins at 715 by determining whether a backup proxy is creating a full backup or an incremental backup. If backup proxy is creating a full backup, at 720, the process reads all data from the reference point in time, and ends at 725 by generating a full backup image. However, if the backup proxy is creating an incremental backup, the process, at 730, only reads changed data from the reference point in time, and ends at 735 by generating an incremental backup image.

In this manner, the methods, systems, and processes described herein enable cloud backups to be created from DRaaS replicas as well as providing support for rich granular metadata for backups (e.g., for granular restore). These methods, systems, and processes eliminate the need for performing separate backups from on premise data centers to cloud storage when DRaaS replication is deployed by directly constructing full or incremental backup images along with full granular metadata from replicas stored in the cloud, and thus provide significant benefits with respect to bandwidth usage and network costs.

Other Embodiments

In one embodiment, application quiescing is performed even when there is no requirement to do so and/or even the applicability of granular restore is present. For example, application quiescing is performed so that a backup is application consistent. In another embodiment, application metadata for granular restore, and the like, includes information such as drives (e.g., C:, D:, and the like), volumes installed on virtual and/or physical machines, applications installed on the virtual and/or physical machines, and associated information (e.g., database version information, database names, and the like), as well as the location of files and folders that contain application data.

In some embodiments, metadata required to generate incremental backups from a replica can be of at least two types. First, in cases where a virtual machine has built in data block change tracking capability, the metadata can include identifiers that capture the state of the virtual machine's disks at the time of a snapshot that is taken for backup. Therefore, when generating an incremental backup from the replica, the underlying change tracking mechanisms can be queried to get a list of changed blocks between the (change tracking identifiers of the) previous full or incremental backups up to a current change tracking identifier. Once a list of changed data blocks is obtained, an incremental backup including those changed data blocks can be created. Second, in cases where the underlying change tracking mechanism does not exist or cannot be used, a replication agent and/or a replication system can keep track of changed blocks (since the replication system detects and replicates only changed blocks) between previous and current snapshots. When creating backups from replicas, a backup proxy can then use this information to obtain the list of changed data blocks since the previous full or incremental backup, and create an incremental backup that includes only those changed data blocks.

In other embodiments, a single backup image may not necessarily be a single file and may include multiple objects created in cloud storage. In certain embodiments, the use of snapshots in the systems, methods, and processes described herein can be at least two-fold. First, a snapshot can be used to obtain a frozen view (e.g., in the case where data is changing while a backup is ongoing resulting in inconsistent backups). In this case, a snapshot provides a view where data is not changing. Second, applications are quiesced first and a snapshot is then generated. This process results in application consistency and application consistent backups because quiescing causes applications to flush their in-memory data, and the like, to disk so that the state of the disk becomes application-consistent. In this example, quiescing of a file system and/or applications is performed to enable consistent backups (e.g., file system consistent and application consistent backups, respectively).

In one embodiment, a replication operation may involve replication metadata, which may not be the same information that is required for backup operations and restore operations (e.g., granular metadata). In another embodiment, and in certain configurations and deployments, a backup agent and a replication agent may not be implemented in a virtual machine, but instead, may be implemented in a hypervisor host, or even in a different virtual machine (e.g., a virtual machine appliance) on the hypervisor host. Likewise, a replication manager may be implemented on a different computing device other than a backup server.

In certain embodiments, a backup agent quiesces one or more applications, triggers snapshot creation, and generates metadata. The backup agent then communicates with a replication agent to have the replication agent mark this state with a consistency marker in a replication stream so that a replica will have this state marked for a backup proxy to be able to use (the marked state) to create a backup from the replica (e.g., as opposed to using the latest state of the replica which could change frequently). In this example, both virtual machines and physical machines can be sources of data.

In one embodiment, a replication consistency checkpoint involves capturing and/or remembering a time a consistent snapshot is performed for use by a backup operation. This enables a backup proxy in the cloud to have a replica go back to that point in time when creating a backup image out of the replica. Therefore, a replication consistency marker is a point in time that a replication agent notes, remembers, and/or tracks in order to be able to go back to (e.g., to provide a view of data at that point in time to a backup proxy).

Example Computing Environment

Figure 8:
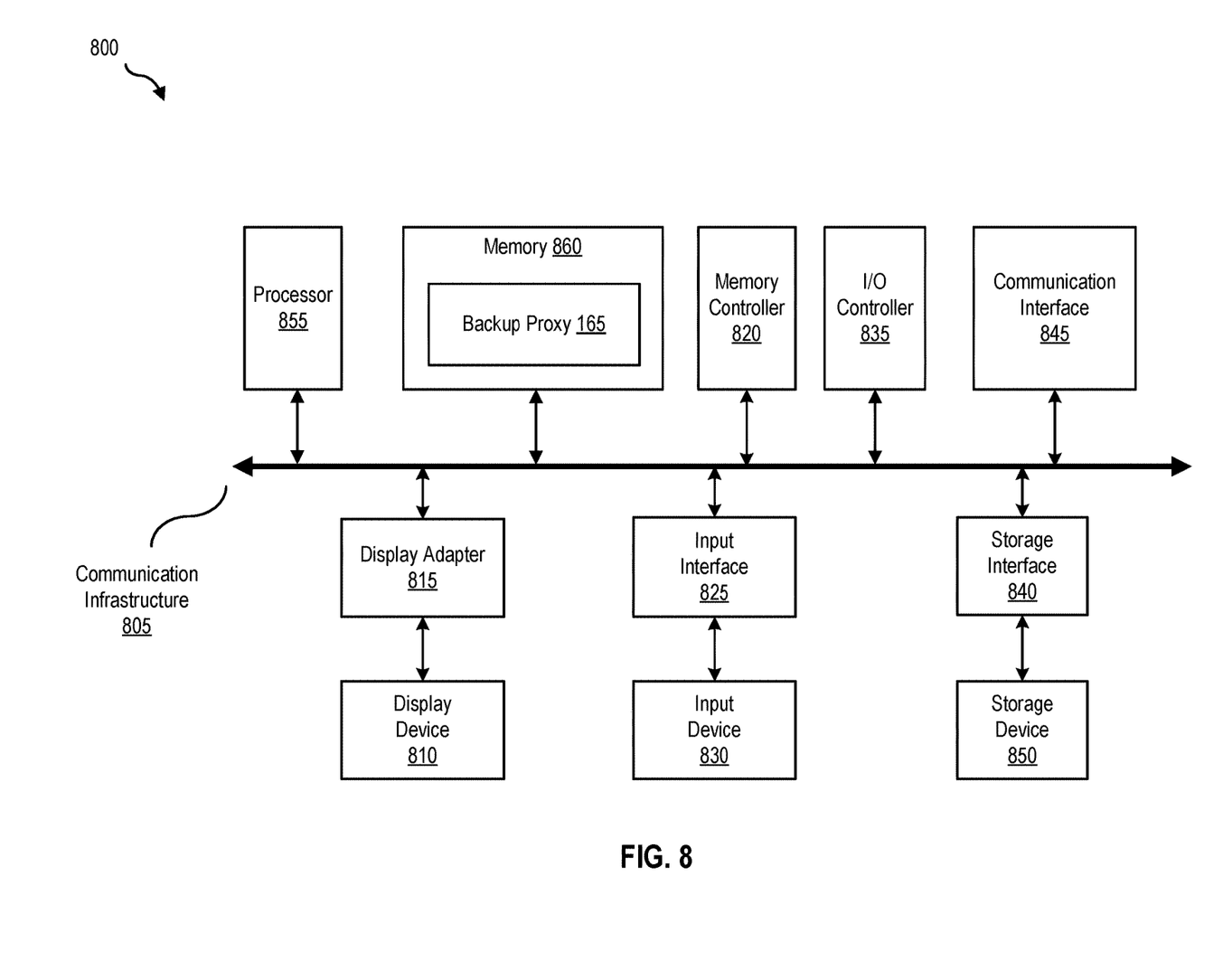
FIG. 8 is a block diagram of a computing system 800, according to one embodiment of the present disclosure.

FIG. 8 is a block diagram of a computing system 800, according to one embodiment of the present disclosure. Computing system 800 can include cloud computing device 155 and broadly represents any single or multi-processor computing device or system capable of executing computer-readable instructions. Examples of computing system 800 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 800 may include at least one processor 855 and a memory 860. By executing the software that executes backup proxy 165, computing system 800 becomes a special purpose computing device that is configured to perform backup operations using replicas (e.g., replicas stored in a public cloud, and the like).

Processor 855 generally represents any type or form of processing unit capable of processing data or interpreting and executing instructions. In certain embodiments, processor 855 may receive instructions from a software application or module. These instructions may cause processor 855 to perform the functions of one or more of the embodiments described and/or illustrated herein. For example, processor 855 may perform and/or be a means for performing all or some of the operations described herein. Processor 855 may also perform and/or be a means for performing any other operations, methods, or processes described and/or illustrated herein. Memory 860 generally represents any type or form of volatile or non-volatile storage devices or mediums capable of storing data and/or other computer-readable instructions. Examples include, without limitation, random access memory (RAM), read only memory (ROM), flash memory, or any other suitable memory device. Although not required, in certain embodiments computing system 800 may include both a volatile memory unit and a non-volatile storage device. In one example, program instructions implementing backup proxy 165 and DR coordinator 160 (or alternatively, backup agent 110 and replication agent 115) may be loaded into memory 860.

In certain embodiments, computing system 800 may also include one or more components or elements in addition to processor 855 and/or memory 860. For example, as illustrated in FIG. 8, computing system 800 may include a memory controller 820, an Input/Output (I/O) controller 835, and a communication interface 845, each of which may be interconnected via a communication infrastructure 805. Communication infrastructure 805 generally represents any type or form of infrastructure capable of facilitating communication between one or more components of a computing device. Examples of communication infrastructure 805 include, without limitation, a communication bus (such as an Industry Standard Architecture (ISA), Peripheral Component Interconnect (PCI), PCI express (PCIe), or similar bus) and a network.

Memory controller 820 generally represents any type/form of device capable of handling memory or data or controlling communication between one or more components of computing system 800. In certain embodiments memory controller 820 may control communication between processor 855, memory 860, and I/O controller 835 via communication infrastructure 805. In certain embodiments, memory controller 820 may perform and/or be a means for performing, either alone or in combination with other elements, one or more of the operations or features described and/or illustrated herein.

I/O controller 835 generally represents any type or form of module capable of coordinating and/or controlling the input and output functions of a virtual machine and/or a physical computing device. For example, in certain embodiments I/O controller 835 may control or facilitate transfer of data between one or more elements of computing system 800, such as processor 855, memory 860, communication interface 845, display adapter 815, input interface 825, and storage interface 840.

Communication interface 845 broadly represents any type or form of communication device or adapter capable of facilitating communication between computing system 800 and one or more other devices. Communication interface 845 may facilitate communication between computing system 800 and a private or public network including additional computing systems. Examples of communication interface 845 include, without limitation, a wired network interface (such as a network interface card), a wireless network interface (such as a wireless network interface card), a modem, and any other suitable interface. Communication interface 845 may provide a direct connection to a remote server via a direct link to a network, such as the Internet, and may also indirectly provide such a connection through, for example, a local area network (e.g., an Ethernet network), a personal area network, a telephone or cable network, a cellular telephone connection, a satellite data connection, or any other suitable connection.

Communication interface 845 may also represent a host adapter configured to facilitate communication between computing system 800 and one or more additional network or storage devices via an external bus or communications channel. Examples of host adapters include, Small Computer System Interface (SCSI) host adapters, Universal Serial Bus (USB) host adapters, Institute of Electrical and Electronics Engineers (IEEE) 1394 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like. Communication interface 845 may also allow computing system 800 to engage in distributed or remote computing (e.g., by receiving/sending instructions to/from a remote device for execution).

As illustrated in FIG. 8, computing system 800 may also include at least one display device 810 coupled to communication infrastructure 805 via a display adapter 815. Display device 810 generally represents any type or form of device capable of visually displaying information forwarded by display adapter 815 (e.g., in a GUI). Similarly, display adapter 815 generally represents any type or form of device configured to forward graphics, text, and other data from communication infrastructure 805 (or from a frame buffer, as known in the art) for display on display device 810. Computing system 800 may also include at least one input device 830 coupled to communication infrastructure 805 via an input interface 825. Input device 830 generally represents any type or form of input device capable of providing input, either computer or human generated, to computing system 800. Examples of input device 830 include a keyboard, a pointing device, a speech recognition device, or any other input device.

Computing system 800 may also include storage device 850 coupled to communication infrastructure 805 via a storage interface 840. Storage device 850 generally represents any type or form of storage devices or mediums capable of storing data and/or other computer-readable instructions. For example, storage device 850 may include a magnetic disk drive (e.g., a so-called hard drive), a floppy disk drive, a magnetic tape drive, an optical disk drive, a flash drive, or the like. Storage interface 840 generally represents any type or form of interface or device for transferring and/or transmitting data between storage device 850, and other components of computing system 800. Storage device 850 may be configured to read from and/or write to a removable storage unit configured to store computer software, data, or other computer-readable information. Examples of suitable removable storage units include a floppy disk, a magnetic tape, an optical disk, a flash memory device, or the like. Storage device 850 may also include other similar structures or devices for allowing computer software, data, or other computer-readable instructions to be loaded into computing system 800. For example, storage device 850 may be configured to read and write software, data, or other computer-readable information. Storage device 850 may also be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from that shown in FIG. 8. Computing system 800 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 800 for storage in memory via a network such as the Internet or upon a carrier medium.

The computer-readable medium containing the computer program may be loaded into computing system 800 (e.g., virtual machines 105(1)-(N), backup server 135, or cloud computing device 155). All or a portion of the computer program stored on the computer-readable medium may then be stored in virtual disks 120(1)-(N) and/or cloud storage device 170. When executed by processor 855, a computer program loaded into computing system 800 may cause processor 855 to perform and/or be a means for performing the functions of one or more of the embodiments described herein. Alternatively, one or more of the embodiments described and/or illustrated herein may be implemented in firmware and/or hardware. For example, computing system 800 may be configured as an application specific integrated circuit (ASIC) adapted to implement one or more of the embodiments disclosed herein.

Example Networking Environment

Figure 9:
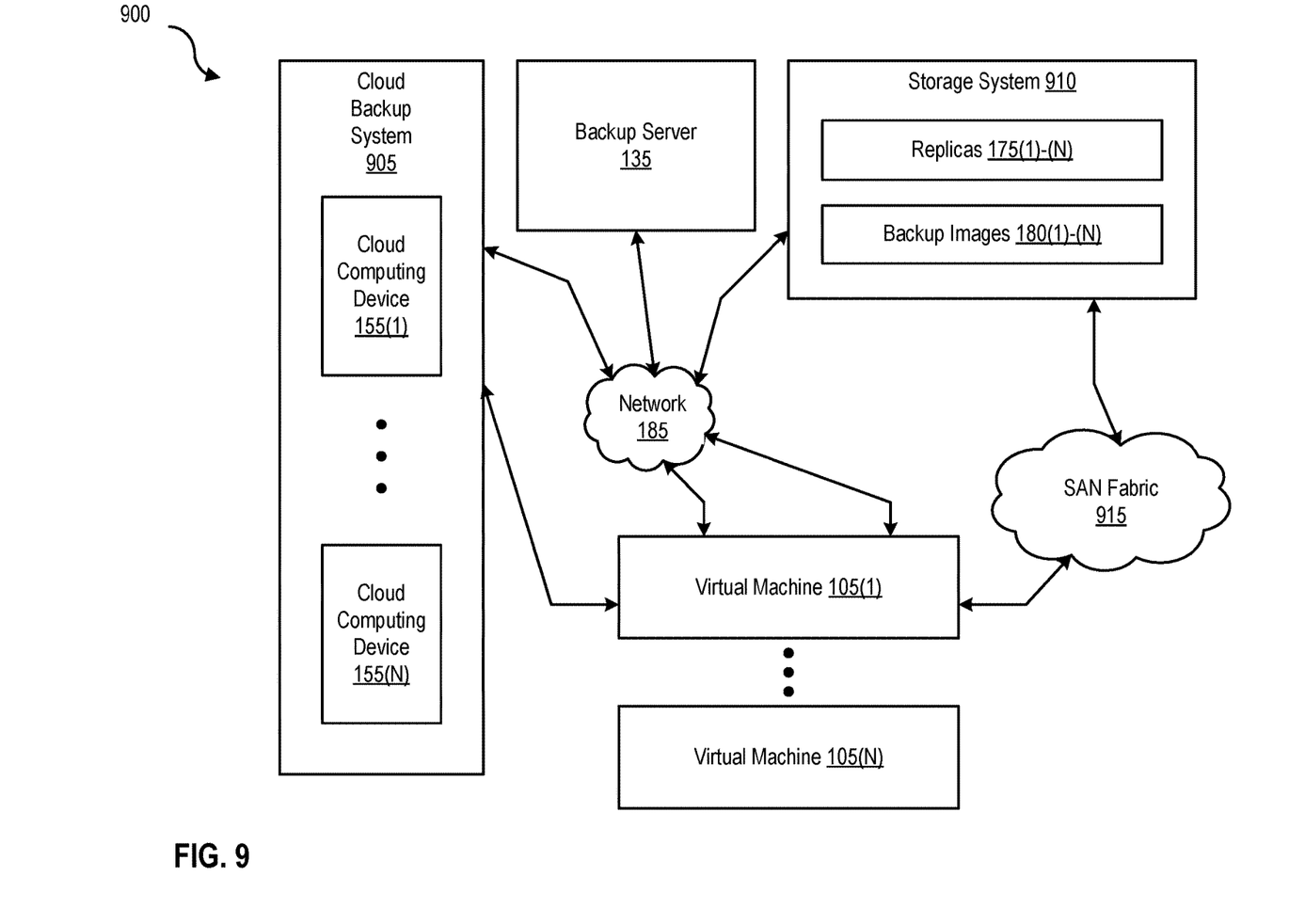
FIG. 9 is a block diagram of a networking system 900, according to one embodiment of the present disclosure.

FIG. 9 is a block diagram of a networked system, illustrating how various computing devices can communicate via a network, according to one embodiment. In certain embodiments, network-attached storage (NAS) devices may be configured to communicate with virtual machines 105(1)-(N), backup server 135, and/or cloud computing device 155 using Network File System (NFS), Server Message Block (SMB), or Common Internet File System (CIFS). Network 185 generally represents any type or form of computer network or architecture capable of facilitating communication between virtual machines 105(1)-(N), backup server 135, and/or cloud computing device 155.

In certain embodiments, a communication interface, such as communication interface 845 in FIG. 8, may be used to provide connectivity between virtual machines 105(1)-(N), backup server 135, and/or cloud computing device 155, and network 185. The embodiments described and/or illustrated herein are not limited to the Internet or any particular network-based environment. In some embodiments, network 185 can be a Storage Area Network (SAN). In other embodiments, backup agent 110 and/or replication agent 115 may be part of virtual machines, or may be separate. If separate, backup agent 110 and/or replication agent 115 and the computing device backup agent 110 and/or replication agent 115 are implemented in (e.g., cloud backup system 905) may be communicatively coupled via network 185.

In one embodiment, all or a portion of one or more of the disclosed embodiments may be encoded as a computer program and loaded onto and executed by virtual machines 105(1)-(N), one or more physical machines, backup server 135, and/or cloud computing device 155. All or a portion of one or more of the embodiments disclosed herein may also be encoded as a computer program, stored on storage system 910, and distributed over network 185.

In some examples, all or a portion of cloud backup system 905, cloud computing device 155, and/or cloud storage device 170 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, backup agent 110 and replication agent 115, or alternatively, DR coordinator 160 and backup proxy 165, may transform the behavior of virtual machines 105(1)-(N) and/or backup server 135 or cloud computing device 155, respectively, to perform backup operations using replicas stored in a public or private cloud.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A computer-implemented method comprising:
creating a replica of a virtual machine, wherein
the virtual machine is at a primary site,
the replica is created at a secondary site as part of a replication operation, and
the replica comprises
data associated with the virtual machine, and
metadata associated with one or more applications executing on the virtual machine;
performing a backup operation at the secondary site, wherein
the performing the backup operation comprises generating a backup image at a point-in-time from the replica using the metadata, and
the backup operation is performed by a backup proxy that is managed from the primary site by a backup server;
extracting granular metadata from the metadata in the replica, the granular metadata having a higher level of granularity than the metadata in the replica; and
sending the granular metadata to the backup server.

2. The computer-implemented method of claim 1, wherein the metadata comprises information for granular restore of the virtual machine, the metadata is generated by quiescing the one or more applications, and the metadata is stored on one or more virtual disks.

3. The computer-implemented method of claim 1, wherein performing the backup operation further comprises:
generating a snapshot of the replica at a reference point in time prior to performing the backup operation, and
generating a full backup image or an incremental backup image from the snapshot.

4. The computer-implemented method of claim 2, wherein the metadata comprises data locations of one or more blocks of the data, and the data locations are used by the backup server to restore the virtual machine from the backup image.

5. The computer-implemented method of claim 1, wherein the backup proxy is another virtual machine, a container, or a server-less module.

6. The computer-implemented method of claim 2, wherein the quiescing of the one or more applications is performed by a replication agent executing on the virtual machine, the metadata is generated by a backup agent executing on the virtual machine, and the replication operation is performed by the replication agent.

7. The computer-implemented method of claim 3, wherein the performing the backup operation further comprises:
generating the snapshot of the replica at the reference point in time,
generating the backup image in a backup format,
mounting the snapshot,
retrieving granular metadata for the one or more applications from the metadata in the replica, and
sending the granular metadata to the backup server.

8. A non-transitory computer readable storage medium comprising program instructions executable to:
create a replica of a virtual machine, wherein
the virtual machine is at a primary site,
the replica is created at a secondary site as part of a replication operation, and
the replica comprises
data associated with the virtual machine, and
metadata associated with one or more applications executing on the virtual machine;
perform a backup operation at the secondary site, wherein
the program instructions executable to perform the backup operation comprises program instructions executable to generate a backup image at a point-in-time from the replica using the metadata, and
the backup operation is performed by a backup proxy that is managed from the primary site by a backup server;
extract granular metadata from the metadata in the replica, the granular metadata having a higher level of granularity than the metadata in the replica; and
send the granular metadata to the backup server.

9. The non-transitory computer readable storage medium of claim 8, wherein the metadata comprises information for granular restore of the virtual machine, the metadata is generated by quiescing the one or more applications, and the metadata is stored on one or more virtual disks.

10. The non-transitory computer readable storage medium of claim 8, wherein the program instructions executable to perform the backup operation further comprise further program instructions executable to:
generate a snapshot of the replica at a reference point in time prior to performing the backup operation,
retrieve the metadata from the replica, and
generate a full backup image or an incremental backup image from the snapshot.

11. The non-transitory computer readable storage medium of claim 9, wherein the metadata comprises data locations of one or more blocks of the data, and the data locations are used by the backup server to restore the virtual machine from the backup image.

12. The non-transitory computer readable storage medium of claim 8, wherein the backup proxy is at the secondary site and is another virtual machine, a container, or a server-less module.

13. The non-transitory computer readable storage medium of claim 9, wherein
the quiescing of the one or more applications is performed by a replication agent executing on the virtual machine,
the metadata is generated by a backup agent executing on the virtual machine, and
the replication operation is performed by the replication agent.

14. The non-transitory computer readable storage medium of claim 10, wherein the program instructions executable to perform the backup operation further comprise further program instructions executable to:
generate the snapshot of the replica at the reference point in time,
generate the backup image in a backup format,
mount the snapshot,
retrieve granular metadata for the one or more applications from the metadata in the replica, and
send the granular metadata to the backup server.

15. A system comprising:
one or more processors; and
a memory coupled to the one or more processors, wherein the memory stores program instructions executable by the one or more processors to
create a replica of a virtual machine, wherein
the virtual machine is at a primary site,
the replica is created at a secondary site as part of a replication operation, and
the replica comprises data associated with the virtual machine, and
metadata associated with one or more applications executing on the virtual machine;
perform a backup operation at the secondary site, wherein
the program instructions executable by the one or more processors to perform the backup operation comprises program instructions executable by the one or more processors to generate a backup image at a point-in-time from the replica using the metadata, and
the backup operation is performed by a backup proxy that is managed from the primary site by a backup server;
extract granular metadata from the metadata in the replica, the granular metadata having a higher level of granularity than the metadata in the replica; and
send the granular metadata to the backup server.

16. The system of claim 15, wherein the metadata comprises information for granular restore of the virtual machine, the metadata is generated by quiescing the one or more applications, and the metadata is stored on one or more virtual disks.

17. The system of claim 15, wherein the program instructions executable by the one or more processors to perform the backup operation further comprise further program instructions executable by the one or more processors to:
generate a snapshot of the replica at a reference point in time prior to performing the backup operation,
retrieve the metadata from the replica, and
generate a full backup image or an incremental backup image from the snapshot.

18. The system of claim 16, wherein
the metadata comprises data locations of one or more blocks of the data, and
the data locations are used by the backup server to restore the virtual machine from the backup image.

19. The system of claim 16, wherein
the quiescing of the one or more applications is performed by a replication agent executing on the virtual machine,
the metadata is generated by a backup agent executing on the virtual machine, and
the replication operation is performed by the replication agent.

20. The system of claim 17, wherein the program instructions executable by the one or more processors to perform the backup operation further comprise further program instructions executable by the one or more processors to:
generate the snapshot of the replica at the reference point in time, generate the backup image in a backup format,
mount the snapshot,
retrieve granular metadata for the one or more applications from the metadata in the replica, and
send the granular metadata to the backup server.

* * * * *